Inventor
David H. Mawby
By Kemon Palmer, Stewart & Estabrook
Attorneys

March 2, 1965 D. H. MAWBY 3,171,340

IMAGE REPRODUCTION SYSTEMS

Filed July 6, 1962 9 Sheets-Sheet 2

Inventor
David H. Mawby
By Kemon, Palmer, Stewart & Estabrook
Attorneys

March 2, 1965 D. H. MAWBY 3,171,340

IMAGE REPRODUCTION SYSTEMS

Filed July 6, 1962 9 Sheets-Sheet 3

Inventor
David H. Mawby
By Kemon, Palmer, Stewart & Estabrook
Attorneys

March 2, 1965 D. H. MAWBY 3,171,340

IMAGE REPRODUCTION SYSTEMS

Filed July 6, 1962 9 Sheets-Sheet 4

Inventor
David H. Mawby
By Kemon, Palmer, Stewart & Estabrook
Attorneys

March 2, 1965 D. H. MAWBY 3,171,340

IMAGE REPRODUCTION SYSTEMS

Filed July 6, 1962 9 Sheets-Sheet 5

Inventor
David H. Mawby
By Kimon, Palmer, Stewart & Estabrook
Attorneys

March 2, 1965 D. H. MAWBY 3,171,340

IMAGE REPRODUCTION SYSTEMS

Filed July 6, 1962 9 Sheets-Sheet 6

Inventor
David H. Mawby
By Kemon, Palmer, Stewart & Estabrook
Attorneys

March 2, 1965 D. H. MAWBY 3,171,340

IMAGE REPRODUCTION SYSTEMS

Filed July 6, 1962 9 Sheets-Sheet 7

Inventor

David H. Mawby

By Kemon, Palmer, Stewart & Estabrook

Attorneys

March 2, 1965 D. H. MAWBY 3,171,340

IMAGE REPRODUCTION SYSTEMS

Filed July 6, 1962 9 Sheets-Sheet 8

Inventor
David H. Mawby
By Kemon Palmer Stewart & Estabrook
Attorneys

March 2, 1965 D. H. MAWBY 3,171,340

IMAGE REPRODUCTION SYSTEMS

Filed July 6, 1962

9 Sheets-Sheet 9

Inventor

David H. Mawby

By Kemon, Palmer, Stewart & Estabrook

Attorneys

United States Patent Office 3,171,340
Patented Mar. 2, 1965

3,171,340
IMAGE REPRODUCTION SYSTEMS

David Harry Mawby, London, England, assignor to Crosfield Electronics Limited, London, England, a British company Filed July 6, 1962, Ser. No. 207,895
Claims priority, application Great Britain, July 12, 1961, 25,250/61
5 Claims. (Cl. 95—73)

This invention relates to the production of visual images. The invention is particularly, but not exclusively, concerned with colour correction in the production of separation negatives or positives for use in colour reproduction.

In colour reproduction, an original is generally photographed through a number of colour filters to produce separation negatives representing the colour components of the original and these are used to prepare printing cylinders or plates for the different colour components from which the multicolour prints are made. However, the separation negatives, or the positives made from them, are not usually suitable for the preparation of printing surfaces directly, owing to the difficulties of obtaining colour filters and inks of suitable complementary colour response. For example, a printing ink which is normally magenta and which should therefore reflect only magenta light, may also reflect some light in the yellow part of the spectrum. As the amount of magenta printed is dependent on the complement of the green component of the original, and the amount of yellow ink printed should be dependent only on the complement of the blue component of the original, the reflection of yellow light by the magenta printing ink results in colour distortion. To overcome this, where both inks are printed at a given element of the picture, the weight of yellow ink which is applied should be reduced by an amount dependent on the amount of magenta ink applied. This process constitutes colour correction, and may be carried out by photographic masking, or by methods involving the modulation of a scanning light source by means of an electric signal representing the correction to be applied.

The problem of correction of visual images also arises in connection with tonal reproduction, particularly when a print is to be made from a transparency. In making a print from a transparency there is inevitably a considerable amount of tonal compression, and the final effect depends greatly on the manner in which this tonal compression is distributed over the available density range.

According to the present invention, the transparency to be corrected is placed substantially in contact with a light-sensitive sheet which is also light-transmitting, and two light beams such that the light-sensitive sheet is insensitive to the first but sensitive to the second are projected on to the transparency and are scanned together over the surface of the transparency so that the light-sensitive sheet is exposed through the transparency by light from the second beam, the light from the first beam which passes through the transparency and light-sensitive sheet falling on a photo-electric device the output of which is applied to a correction computer generating an electric signal, representing the required correction for the scanned element, which modulates the second light beam, whereby each element of the light-sensitive sheet is exposed in accordance with the transmittance values of the transparency corrected by the modulation of the second light beam. The intensity of the first light beam, to which the said sheet is insensitive, and which is used to derive the required correction, remains unaffected by the correcting modulation. The term "light beam" is intended to cover the use of beams of infra-red and ultraviolet radiation as well as the use of visible radiation.

In the case of colour correction, each of a set of separation transparencies to be corrected is arranged to be scanned by two light sources in the manner described above. A separation transparency to be corrected and the correcting separation transparency or transparencies are scanned simultaneously, and the signals from the photo cells in the correcting channel or channels are applied to the computer which determines the correction to be applied to the intensity of the exposing light source. If desired, a proportion of the signal from the channel to be corrected can also be used in determining the correction, thereby introducing compression or tonal correction.

In the preferred form of apparatus embodying the invention, the light beams are red and blue, the sheet to be exposed being insensitive to the red beam, and a red filter is placed immediately behind the frame containing the transparency and light-sensitive sheet so that the blue light which passes through this combination is blocked by the filter but the red light is allowed to pass through to a photomultiplier.

In order that the invention may be better understood, several examples of colour correction apparatus embodying the invention will now be described with reference to the accompanying drawings, in which.

Figure 1:
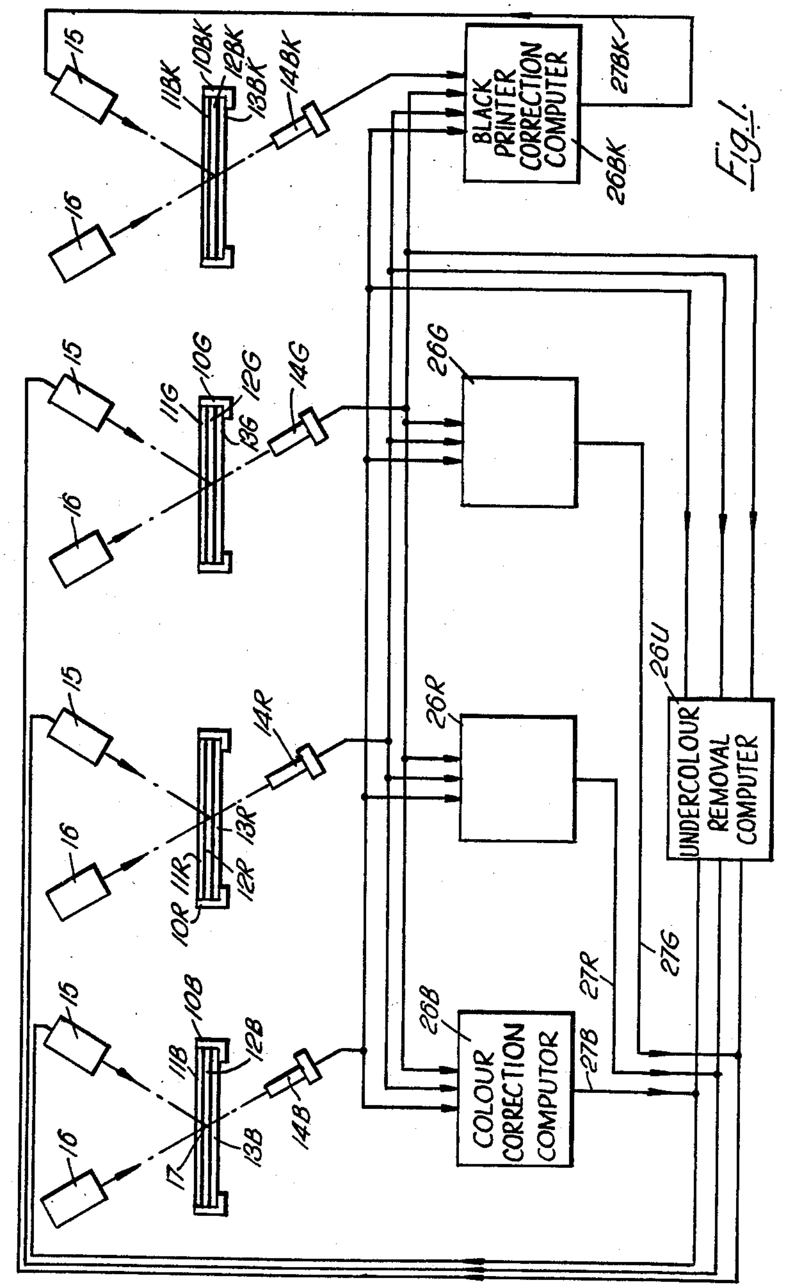
FIGURE 1 is a diagram illustrating a first form of apparatus embodying the invention.
Figure 2:
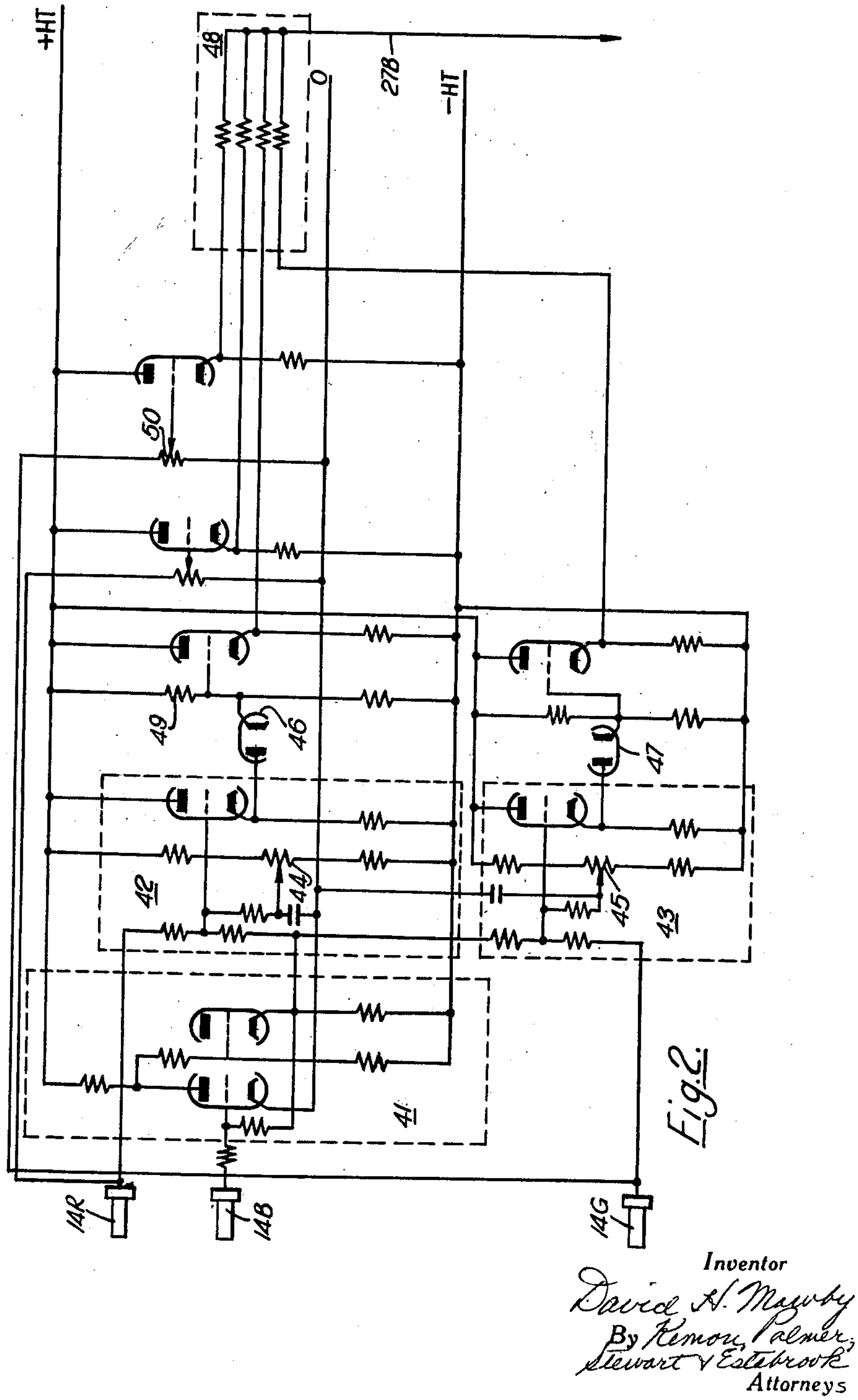
FIGURES 2, 3 and 4 are circuit diagrams of the colour correction computer units shown in FIGURE 1.
Figure 7:
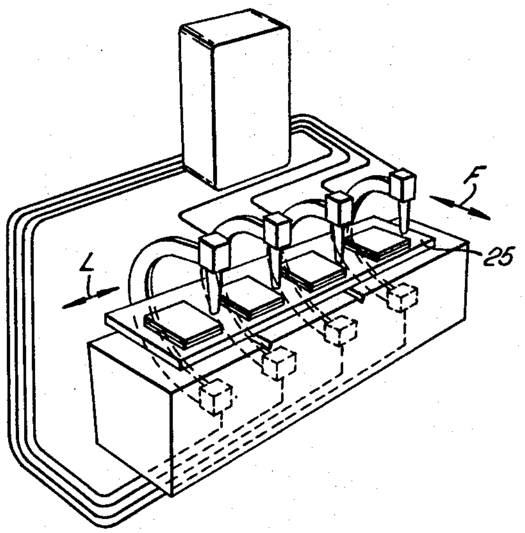
FIGURE 7 is a diagrammatic perspective view of the apparatus as a whole.

In the apparatus illustrated in FIGURES 1 and 2 four frames 10B, 10R, 10G and 10BK are arranged side by side to hold the three-colour component separation transparencies 11B, 11R, 11G and a black printer transparency 11BK, respectively in front of and substantially in contact with three unexposed light-transmitting photographic plates 12B, 12R, 12G and 12BK. A red filter 13B, 13R, 13G and 13BK is arranged behind the plates in each of these frames, and a photo-multiplier 14B, 14R, 14G and 14BK is placed behind each frame to collect the red light passing through the transparency and plate. The separation transparency 11B is associated with an "exposing" blue light source 15 and an "analysing" red light source 16, the light beams from which are focussed on to the same spot 17 on the separation transparency. Similarly, each of the separation transparencies 11R, 11G and 11BK is associated with two light sources and receives red light from one and blue light from the other. The four photographic plates are sensitive to the blue light but not to the red light. The effect of this is that the blue light from the exposing light source 15 produces a latent image on the photographic plate but after passing through the plate is stopped by the red filter 13 behind the plate; and the red light from the analysing light source 16 passes through the photographic plate without producing a latent image and then goes on through the red filter 13 to the photo-multiplier 14. Means are provided for achieving relative movement between the frames 10 and the light spots so that the light spots undergo a scanning motion with respect to the transparencies. In the example which is being described, this is achieved by placing the transparencies side by side in frames on a common table 25 (FIGURE 7) and then giving the table an oscillating motion in its longitudinal direction to produce the line scan (see arrow L) together with a very slow transverse motion to produce the frame scan (see arrow F). In this way, the common light spot produced by the analysing and exposing light sources is caused to scan the whole of the subject in each separation transparency.

The light signals from the three photo-multipliers 14B, 14R and 14G are applied to an electronic correction computer which at each moment of the scanning operation determines the correction to be applied to the scanned element of each separation transparency. The computer includes correction units 20B, 26R and 26G each of which receives a colour component signal from each of the photomultipliers. The three colour corrections are expressed in the form of output signals from these units which are combined with undercolour removal signals from a computer unit 26U and applied by way of conductors 27B, 27R and 27G to beam modulators associated with the three exposing light sources 15. Thus, to correct for the reflection of yellow light from a nominally magenta printing ink, the exposure of the plate 12B from which the yellow printer is to be produced will be reduced (by reducing the intensity of the corresponding exposing light source) by an amount depending on the amplitude of the signal from the photo-multiplier 14G associated with the magenta printer separation transparency 11G.

The transparency which is placed in the black printer channel may, for example, be a white light negative, obtained by exposing the original to white light, or in succession to red, blue and green light; or in some cases a colour separation transparency could be used. The black printer correction computer unit 26BK generates a correcting signal which modifies the exposure of the light-sensitive sheet behind the black printer transparency by modulating the associated blue light beam. Alternatively the transparency can be omitted from the black printer channel and the correction computer unit 26BK is then arranged to compute, on the basis of the signals received from the three coloured channels, a signal representing the whole of the black printer information.

In this way, each of the four exposing light sources 15 is modulated in accordance with the correction required for the associated transparency so that the underlying positive is exposed with corrected information, derived partly by contact printing from the negative itself and partly from the modulation of the exposing light source. The photomultipliers receive light only from the analysing light sources, which are of constant intensity, and therefore the signals from the photo-multipliers contain only information derived from the transparency itself.

FIGURE 2 shows details of the computer correction unit 26B of FIGURE 1. The signals from the photomultiplier 14B, representing the transmittance variations of the negative to be corrected, are inverted in stage 41 and are added in stages 42 and 43 respectively to the correcting signals from the photomultipliers 14R and 14G.

The D.C. levels of the combined signals may be varied by potentiometers 44 and 45. The effect of this is to allow more or less of the signals to pass through biased diodes 46 and 47. The range of adjustment of the potentiometers 44 and 45 may be such that signals of negative polarity (corresponding to colours for which correction is not required) are always blocked by the diodes. The signals passing through the diodes are applied through cathode followers to the mixer stage 48, which also receives, through potentiometers 49 and 50 and associated cathode followers, signals from the correcting photomultipliers 44R and 44G. As explained more fully in my co-pending application Serial No. 85,855, now Patent No. 3,096,394, the effect of a circuit of this kind is to combine a single stage masking (provided by the signals from the potentiometers 49 and 50) with two stage masking (provided by the signals from the diodes 46 and 47). The output of the mixer stage 48 is applied to the beam modulator associated with the blue light source 15 which scans the transparency 11B.

Figure 3:
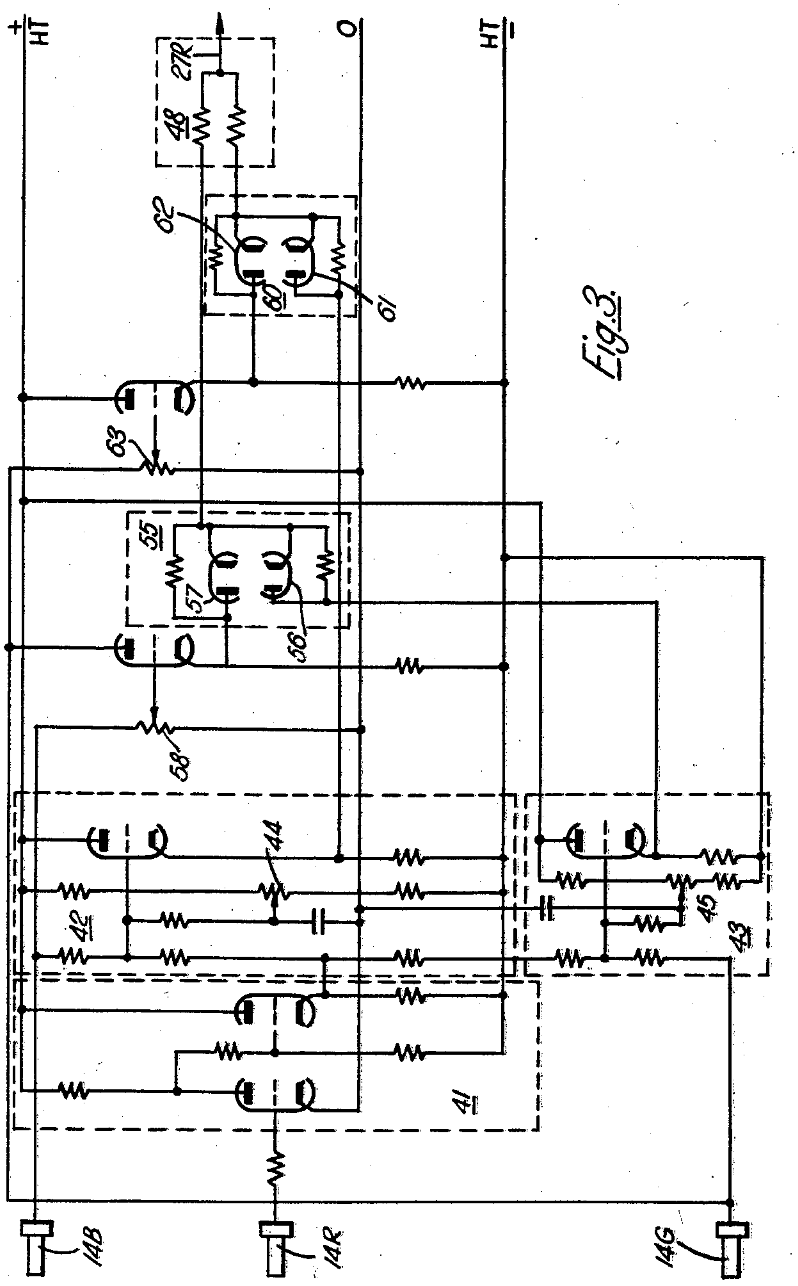

FIGURE 3 shows circuit details of the colour correction unit 26R of FIGURE 1. In this case, the signals from the photo-multiplier 14R, representing the separation negative to be corrected, are applied to an inverter stage 41 similar to that of FIGURE 2 and the inverted signals are combined with signals from the correcting photo-multipliers 14B and 14G in stages 42 and 43, the D.C. levels of the output being adjusted by means of potentiometers 44 and 45. In FIGURE 3 however maximum signal selector units are used in place of the blocking diodes. The maximum signal selector unit 55 receives at the anode of diode 56 a signal from stage 43 representing the combination of the inverted red channel signal and the correcting green channel signal. The anode of the diode 57 receives, through a cathode follower and the potentiometer 58, a signal from the correcting blue channel photo-multiplier 14B. The larger of these two signals is applied to the mixer stage 48. In a similar way, the anode of a diode 61 in the other maximum signal selector unit 60 receives a signal representing the combination of the inverted red channel signal and the correcting blue channel signal and the anode of the other diode 62, receives through a cathode follower and the potentiometer 63, a green channel signal from the potentiometer 14G, the greater of these two signals being applied to the mixer stage 48. The output of the mixer stage is applied to the beam modulator associated with the blue light source 15 which scans the transparency 11R. The effect of using the maximum signal selector circuits is described more fully in my co-pending application No. 85,856.

The circuits of FIGURES 2 and 3, although described for the production of the yellow and cyan printers respectively, can in many cases be interchanged.

Figure 4:
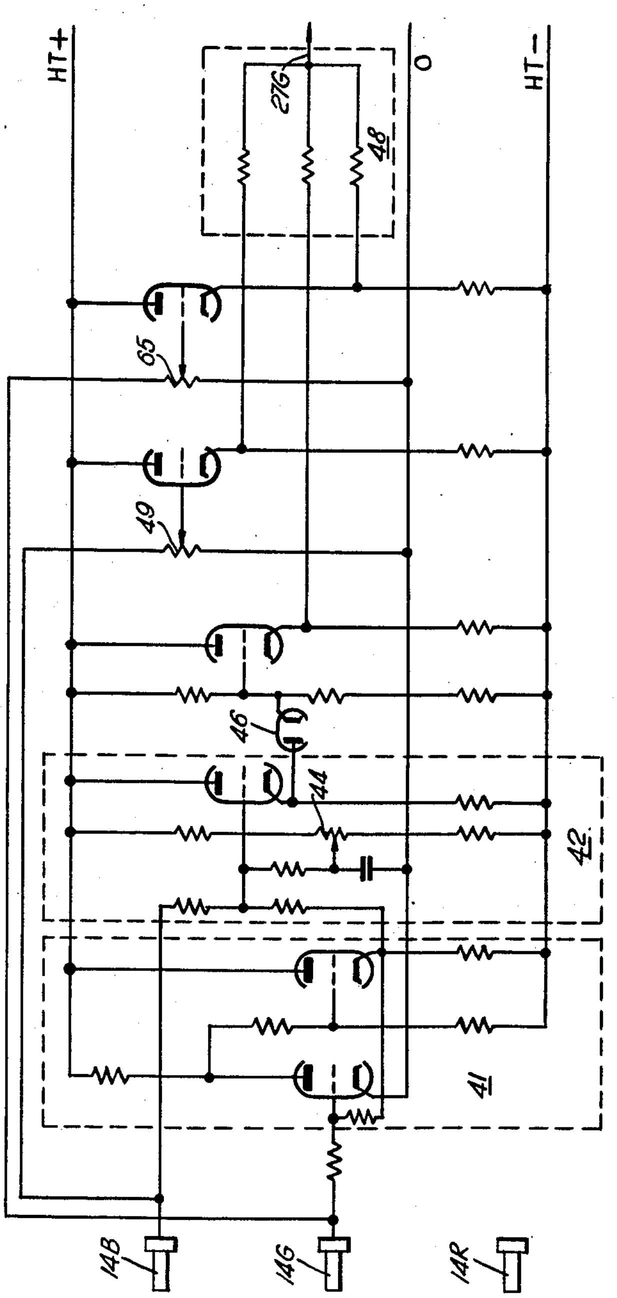

FIGURE 4 shows a circuit diagram of the colour correction unit 26G of FIGURE 1, used in the production of the magenta printer. In this case, only one correcting colour channel signal is used, but the circuit includes self-masking of the corrected negative, that is to say compression of the positive which is being exposed. The purpose of this electronic compression is to enable the contrast ranges of the exposed positives to be matched and it is particularly desirable to have provision for compression when differing amounts of single-stage masking are being applied. The signal from the photomultiplier 14G, representing the negative to be corrected, is applied to the inverter stage 41 and is combined with the correcting colour channel signal from the photomultiplier 14B in stage 42. The output of this stage is applied through a biased diode 46, similar to that shown in FIGURE 2, to a cathode follower stage, the output of which goes to the mixer 18. As in the case of FIGURE 2, there is a direct connection from the correcting photo-multiplier 14B to a potentiometer 49 in the input circuit of a cathode follower, the output of which also goes to the mixer 48. Finally, the mixer 48 receives the self-compression signal from a cathode follower fed from a potentiometer 65 connected to the photo-multiplier 14G.

Figure 5:
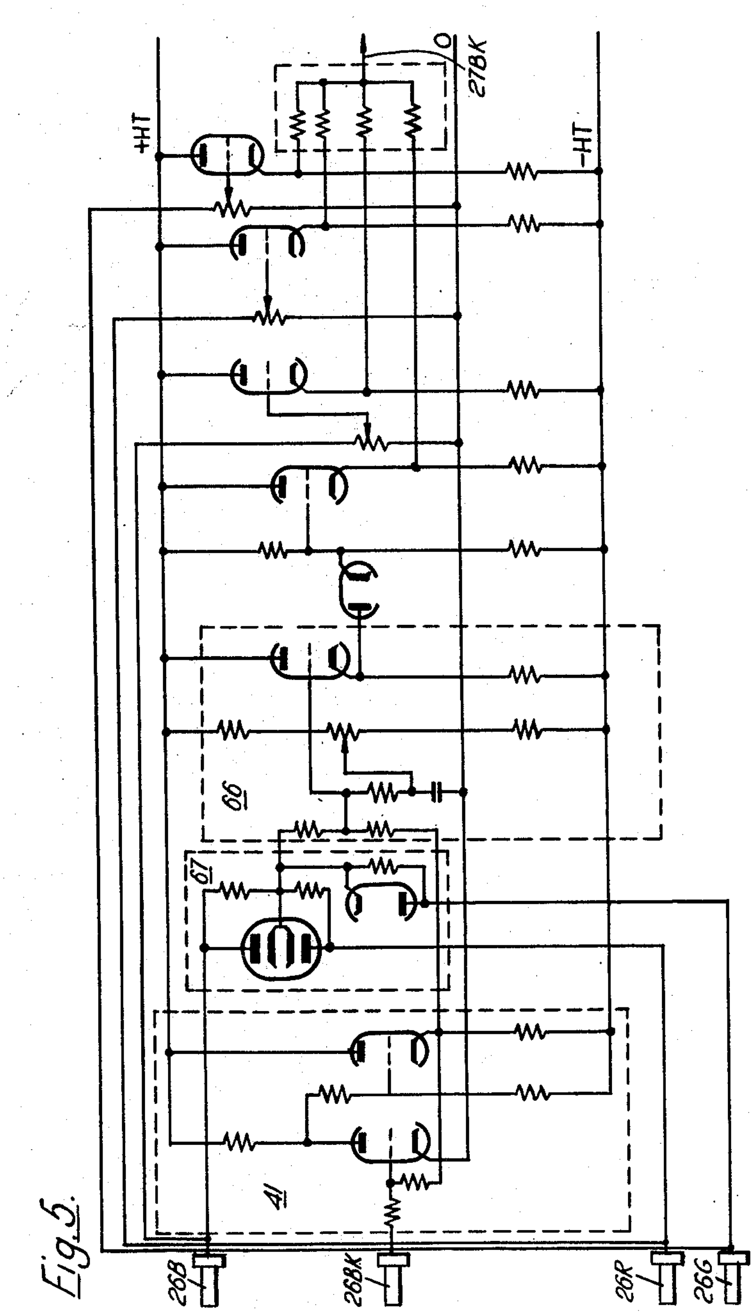
FIGURE 5 is a circuit diagram of the black printer computor unit shown in FIGURE 1.

The black printer correction unit 26BK is shown in detail in FIGURE 5. The signal representing the "white light" transparency to be corrected is applied to the inverter stage 41, the output of which is combined in stage 66 with the largest of the correcting colour component signals, this being selected by means of the three diodes. By subtracting the signal from stage 41 from the maximum colour channel signal, the greys and blacks tend to cancel resulting in no reduction to these densities in the black printer positive; but signals corresponding to colours will not cancel and may be used to corect the exposure.

The output of stage 66 is applied through a biased diode and a cathode follower stage to the mixer 48, in which it is combined with signals representing the three correcting colour components, the amounts of the latter signals being selective in accordance with the degree of grey scale compression which is required.

Figure 6:
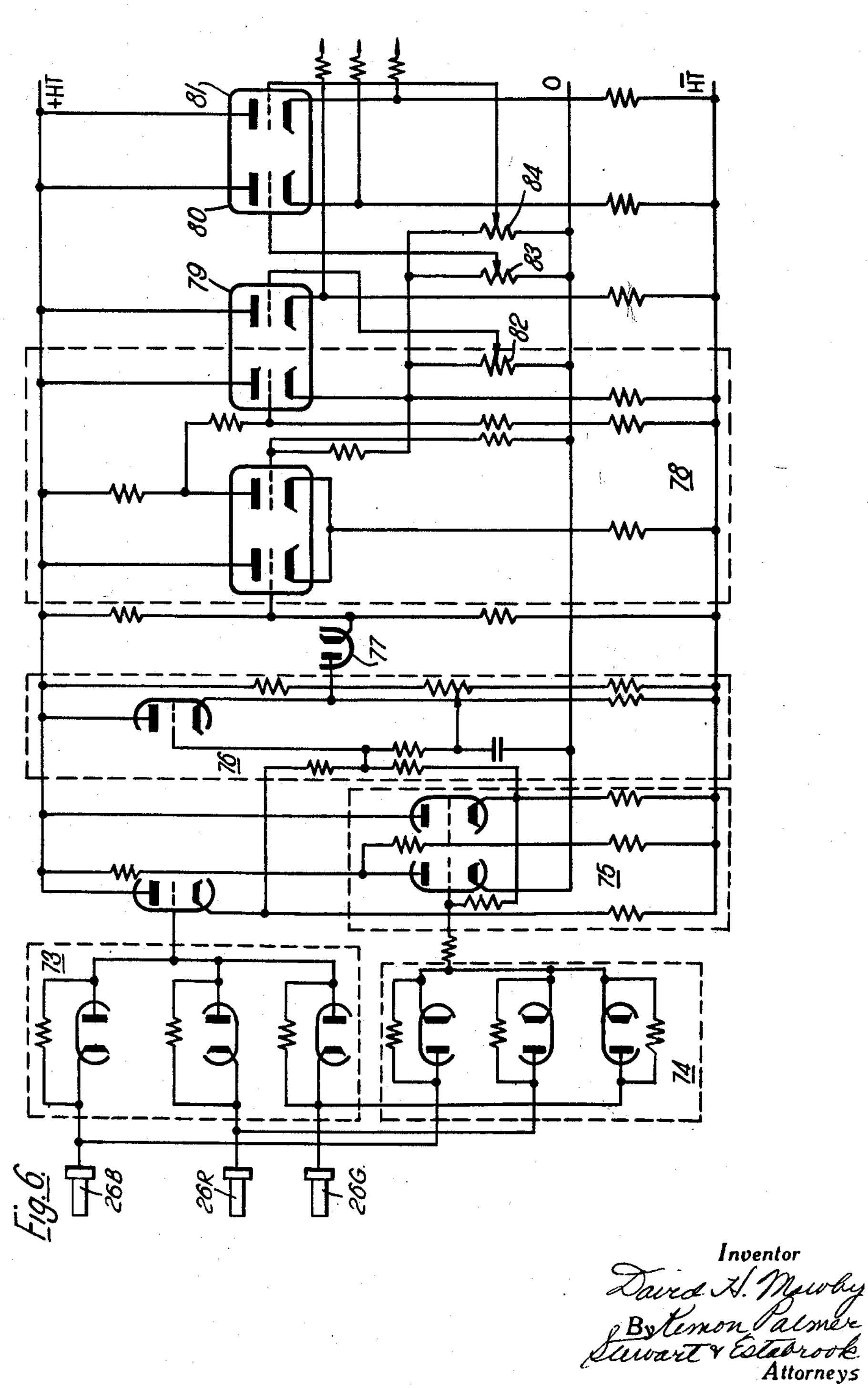
FIGURE 6 is a circuit diagram of the undercolour removal unit shown in FIGURE 1.

The undercolour removal circuit 26U of FIGURE 1 is shown in detail in FIGURE 6. The three colour channel photomultiplier signals are applied to a minimum signal selector circuit 73 and a maximum signal selector circuit 74. The output of the latter is inverted in stage 75 and is added to the output of stage 73 in stage 76. The effect of this is more fully described in my co-pending application Serial No. 114,450. The output of stage 76 is passed through a biased diode 77 to an amplifier 78. The triode sections 79, 80 and 81, with their associated potentiometers 82, 83 and 84 provide separately controlled outputs for the three exposing light sources.

Figure 8:
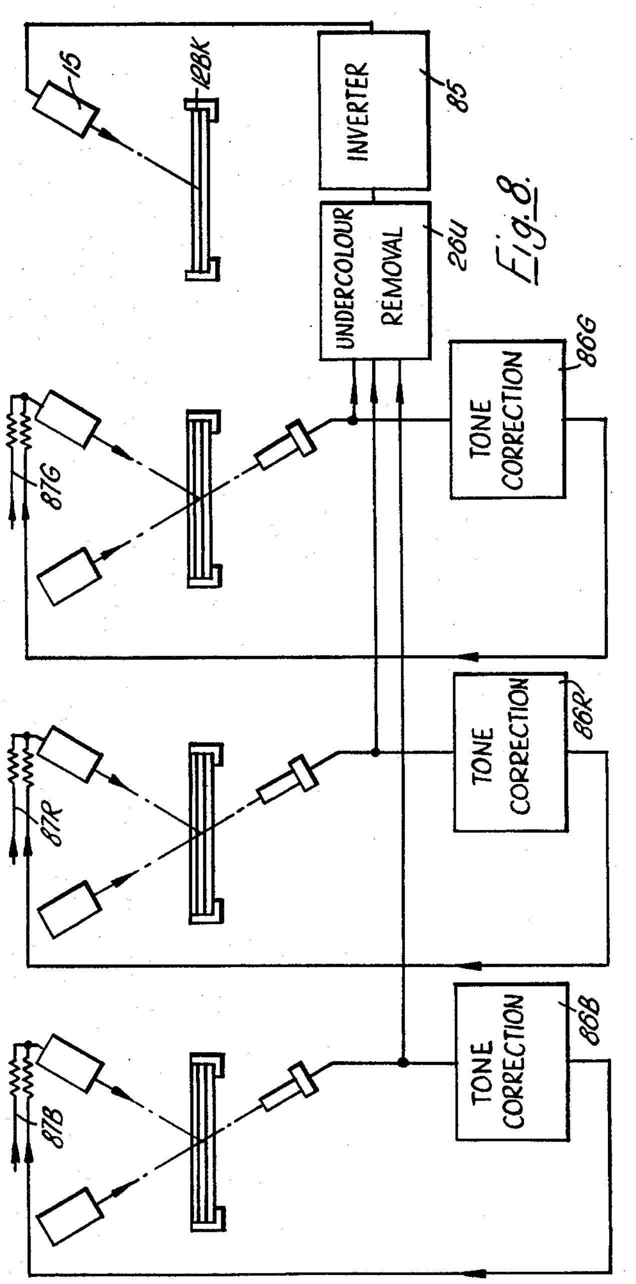
FIGURE 8 illustrates diagrammatically the introduction of tone correction circuits into the apparatus.

FIGURE 8 illustrates a method of tone correction of colour printers and also indicates how the black printer positive 12BK can be exposed directly to its light source 15. In this circuit the output of the undercolour removal circuit 26U, shown in FIGURE 6, is applied through an inverter 85 to the modulating device associated with the light source 15. The output of the photo-multiplier circuits are additionally applied to the three tone correction circuits 86B, 86R and 86G, the correction signals of which are added to the colour correction signals on conductors 87B, 87R and 87G and then applied to the modulating device associated with the exposing light sources, in combination with the colour correction signals of the system of FIGURE 1.

The apparatus which has been described will expose the three colour-corrected photographic printer positives and the black printer positive simultaneously, and the preparation of the printing plates or cylinders then takes place in the usual way.

Th red filter behind each of the positives can be a red dye coated on the back of the film base. This has the advantage of reducing halation due to the back reflection of blue light through the base.

It will be obvious that if desired a single pair of light sources could be used in conjunction with a beam splitting optical system by means of which beams from the two light sources were focussed at a common spot on each of the separation transparencies. In this case, however, only one corrected photographic printer plate could be made in each scanning operation, and the four unexposed photographic printer plates would therefore be placed behind their respective separation transparencies one at a time, in four successive scanning operations. In a further alternative a single analysing light source 16 could be used in conjunction with a beam splitting system for all the separation transparencies to be corrected, together with a separate exposing light source 15 for each of the transparencies. In this case, all the photographic printing plates could be exposed simultaneously, as in the first example described.

As an alternative to the oscillating table described above, a rotating scanner may be used. In this case the separation transparencies are wrapped around a hollow transparent cylinder in axially spaced positions. Each transparency has associated with it a pair of light sources outside the cylinder and a photo-cell inside the cylinder. The unexposed photographic films are wrapped around the transparent cylinder under the corresponding separation transparencies.

The system which has been described has the advantage that the photographic printer plate has sharp resolution since by far the greater part of the exposing information is due to the associated separation transparency and is thus exposed by a contact printing operation. The correcting information from the exposing light source constitutes a smaller part of the total exposing information. Furthermore, although each printer plate is being exposed through the transparency with corrected information at the same time as the transparency is analysed to derive correcting signals for other transparencies, no means for de-modulation of the latter correcting signal is required since the light which reaches the photo-cell is not modulated with the correcting information. Moreover, in the system described in my Patent No. 2,993,953, in which a single light source served for both the analysing and the exposing operations, it was necessary for the exposing light source to have at least a minimum light value at all times in order to provide a light beam for analysing the transparency, and thus in some cases some undesired exposure could take place. In the present invention, the exposing blue light can be completely extinguished without affecting the photo-cell signal, which is due to the analysing red source only. This is especially useful in connection with the reproduction of highlights.

Patent No. 2,993,953 also described an electronic equivalent of the photographic technique which has been called successive two-stage masking. The system according to the present invention can also be used for carrying out the electronic equipment of this form of masking, the details following the system described in Patent No. 2,993,-953.

The apparatus according to the invention can also be used for the production of screened separations, that is to say separation transparencies composed of small separated dots instead of a continuously exposed picture area. To achieve this result, a film screen is combined with the negative and the emulsion to be exposed. However, in a scanner of the kind described above in which the four photographic plates which are to provide the colour printers and the black printer are being exposed simultaneously, the screen lines of the four screens would not be in register, and to avoid modulation of the exposing light source as a function of the screen line, it is necessary that the photo-cells should not respond to the screens, but should respond only to the negative densities, as if the screens were not there. If grey screens were used, the illumination of the photo-cells by the red analysing light source in the example described above would be reduced as the scanning light spot moved over each line of the screen. According to a subsidiary feature of the invention, the screen lines are of such a colour that while substantially preventing the passage of the exposing light they permit the passage of the analysing light. Thus in the example described the screen would be composed of red lines which permit the passage of the red analysing light beam without too great a reduction of intensity.

Figure 9:
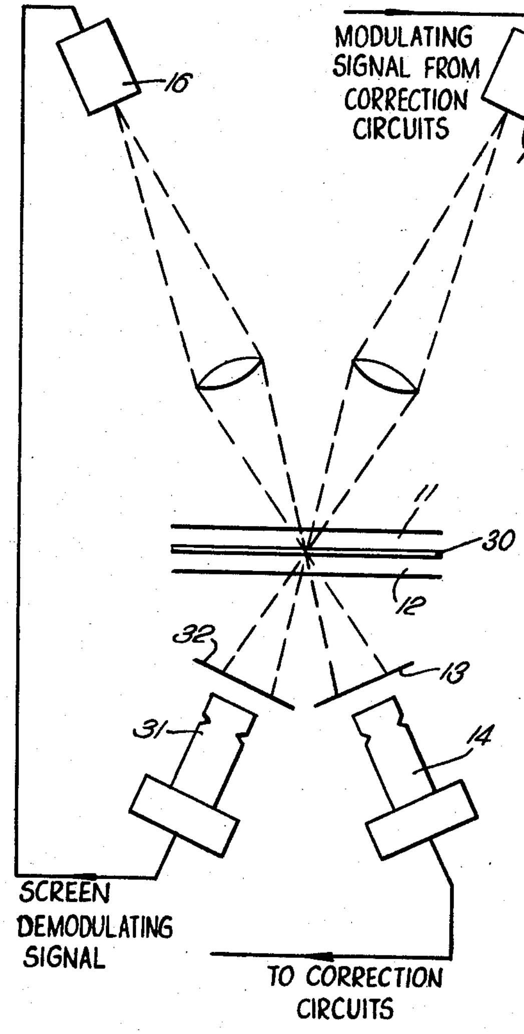
FIGURE 9 illustrates an alternative form of the apparatus.

If desired, further attenuation of the effect of the screen lines can be achieved by placing, behind each combination of screen, negative and emulsion to be exposed, a second photo-cell behind a blue filter, the signal from the second photo-cell being used to modulate the red light source. This is illustrated in the accompanying FIGURE 9, which shows the red screen 30 between the transparency 11 and the light-sensitive sheet 12 and a second photo-multiplier 31 arranged behind a blue filter 32 to provide a signal which is used to modulate the light source 16 from which the red scanning beam is derived. The red screen lines will produce a strong modulation of the signal from the second photo multiplier 31 behind the blue filter and can therefore be used to cancel out the weak unwanted screen modulation which would otherwise be present in the output of the photo multiplier behind the red filter.

It will be appreciated that if the separations to be corrected are exposed one at a time in the scanner according to the invention, only a single screen need be used, and unless the modulation due to the separation transparency which is being exposed is used to correct the exposure of the same transparency, the screen lines will have no effect.

Figure 10:
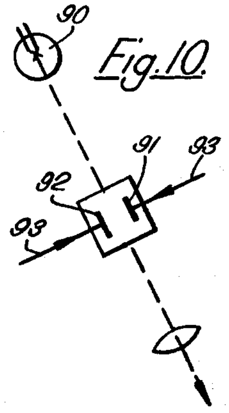
FIGURE 10 shows diagrammatically a modulating device suitable for use in the apparatus.

A Kerr cell may be used, as the beam modulator device in the various forms of apparatus described above. As an example, a cell containing nitrobenzene, which, when subject to an electric field, exhibits polarising properties which are a function of the applied voltage, is inserted in the path of the light beam. This is illustrated in FIGURE 10, in which the beam of polarised radiation from the blue light source 90 passes through the Kerr cell 91. The polarising plates 92 of the latter receive the modulating signal over conductors 93.

If the film to be exposed is sensitive to red light infrared radiation can be used in place of the analysing red light source. In another alternative, if the photo-multipliers work more efficiently in the red-green region, blue and yellow light sources can be used, provided that the film is sufficiently insensitive to the yellow radiation. The blue light source may contain a component of ultra-violet radiation.

In very fast scanning systems the time taken for signals to travel from the photo-multipliers through the circuits to the exposing light source may correspond to a significant movement of the negative in the scanning direction. In this case the movement can be compensated for by arranging that the analysing and exposing spots are separated by a short distance, the exposing spot being delayed with respect to the analysing spot in the scanning direction.

I claim:

1. Image reproduction apparatus comprising means for holding a transparency to be reproduced substantially in contact with a light-sensitive sheet which is also light-transmitting, two light sources, a first adapted to emit radiation of a kind to which the light-sensitive sheet is insensitive and the second adapted to emit radiation of a kind to which said sheet is sensitive, means whereby narrow beams of light from said two light sources are projected on to the transparency to be corrected to form light spots on said transparency, means for scanning said light spots over the surface of said transparency so that said light-sensitive sheet is exposed by the light from said second source which passes through the transparency, a color filter behind the light-sensitive sheet adapted to pass radiation from said first source but to block radiation from said second source, a photoelectric device arranged to receive the light which passes through said filter, a correction computer receiving the output of said photoelectric device and providing an output signal representing the correction required in order to expose the light-sensitive sheet with the desired corrected values, and means modulating the light from said second source in accordance with the correction signal from said computer, whereby said light-sensitive sheet is exposed by light from said second source in accordance with the transmittance values of the uncorrected transparency, corrected by the modulation of said second light source.

2. Colour correction apparatus comprising means for holding a number of separation transparencies, representing colour components of a coloured original to be reproduced, in contact with light-sensitive sheets which are also light-transmitting, means for projecting two beams of light on to each of said transparencies to form light spots on said transparencies, the first light beam being of a kind to which said light-sensitive sheet is insensitive and the second of a kind to which said sheet is sensitive, means for scanning the light spots on each transparency over the surface of the transparency so that the light-sensitive sheet behind said transparency is exposed by the light from said second beam which passes through said transparency, a filter arranged behind each light-sensitive sheet and adapted to block light from said second beam and to pass light from said first beam, a separate photoelectric device receiving the light passing through each filter, a colour correction computer receiving the output signals from said photoelectric devices and providing correction signals representing the corrections required for the individual separation transparencies, and means responsive to each correction signal to modulate said second light beam associated with the corresponding transparency, whereby said light-sensitive sheet is exposed in accordance with the transmittance values of the associated transparency modified by the modulation of said second light source.

3. Apparatus according to claim 2, in which all said separation transparencies and their associated light-sensitive sheets are arranged on a common support member, said apparatus further including driving means for giving said common support member an oscillating motion in two mutually perpendicular directions such that the transparencies and the stationary light spots on the transparencies undergo simultaneous relative scanning motion.

4. Apparatus according to claim 2, for the production of screened separation printer transparencies, in which a screen-carrying transparency is placed adjacent the light-sensitive sheet, the lines of the screen having substantially the same colour transmission characteristics as said filter behind the light-sensitive sheet, whereby said photoelectric device behind said filter is substantially unaffected by the presence of the screen.

5. Apparatus according to claim 2, for the production of screened separation printer transparencies, in which a screen-carrying transparency is placed adjacent the light-sensitive sheets, said apparatus including a further photoelectric device receiving light which passes through said transparency and is also modulated in accordance with the pattern of said screen-carrying transparency, and means combining the signal from the further photoelectric device with the signal from said first photoelectric device to cancel the screen modulation from the latter signal.

References Cited in the file of this patent

UNITED STATES PATENTS

| | | |
|---|---|---|
| 2,691,917 | Curry | Oct. 19, 1954 |
| 2,740,828 | Haynes | Apr. 3, 1956 |